June 14, 1949.  C. SCHEIBNER  2,473,076
COLLAPSIBLE STRUCTURE FOR ICE FISHING

Filed June 27, 1947  2 Sheets-Sheet 1

INVENTOR.
Carl Scheibner.
BY Frank C. Fearman.
ATTORNEY

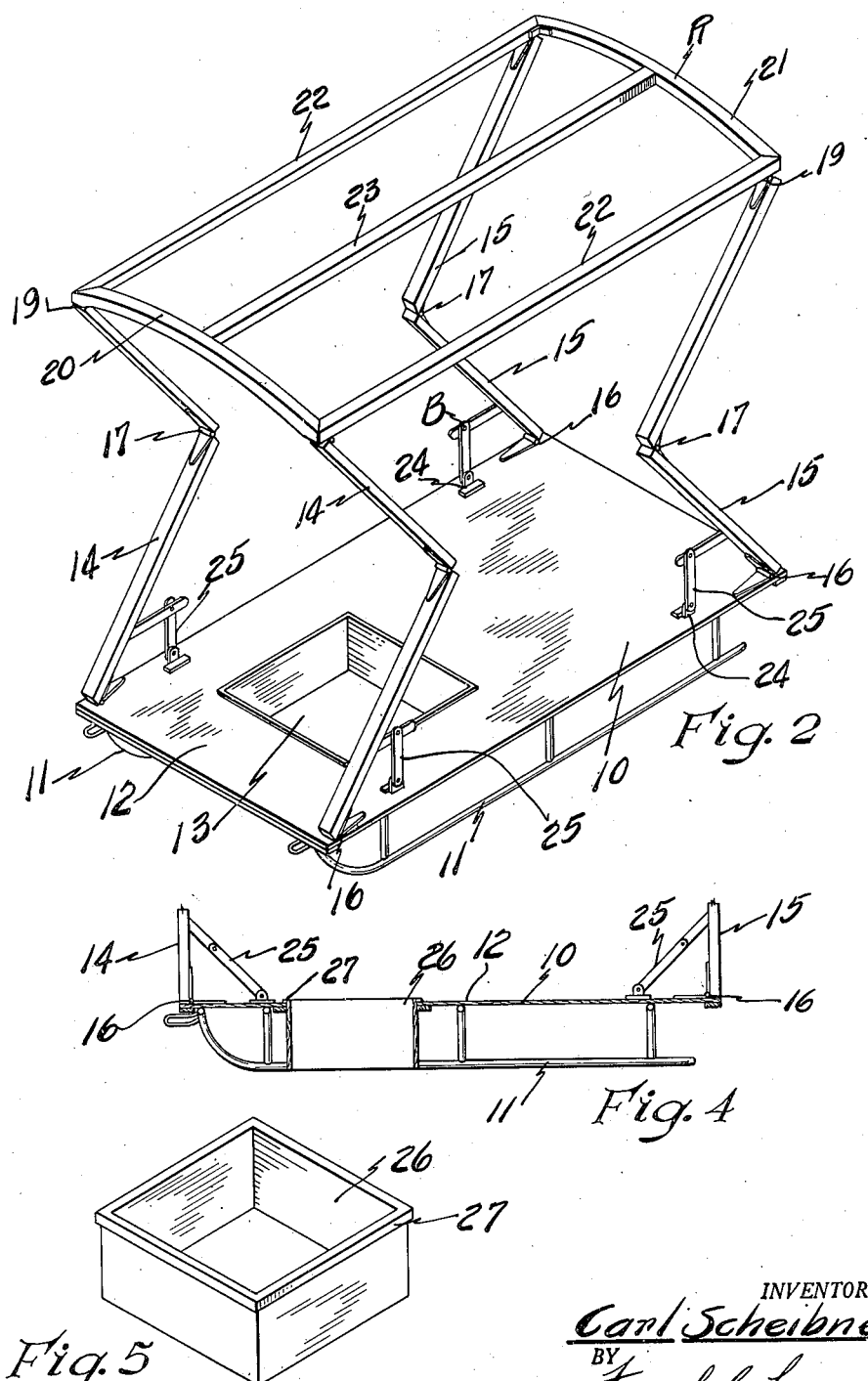

Patented June 14, 1949

2,473,076

UNITED STATES PATENT OFFICE 2,473,076

COLLAPSIBLE STRUCTURE FOR ICE FISHING

Carl Scheibner, Bay City, Mich.

Application June 27, 1947, Serial No. 757,353

1 Claim. (Cl. 296—1)

This invention relates to collapsible frames for canvas covered shanties mounted on sleds for ice fishing and the like.

One of the prime objects of the invention is to design a lightweight, yet substantial frame, which can be readily set up for use, and which can be compactly folded for hauling from one location to another, or to the site for use.

Another object is to provide a simple, easily operable, collapsible frame which is rigid when set up for use, and which forms a neat and windproof shelter for the fisherman or occupant.

A further object is to provide a readily mobile unit including a foldable frame and sled, the top of the sled forming the floor of the structure, and in which an opening is provided, with a bottomless box adapted to be inserted in said opening in alignment with the opening in the ice to exclude light from the hole through which the spearing or fishing is done.

Still a further object is to design a sled structure and foldable frame that can be readily manufactured and assembled, and which is sufficiently rigid to withstand all wind pressure etc. to which a structure of this nature is subjected.

With the above and other objects in view, the present invention consists in the combination and arrangement of parts, hereinafter more fully described, illustrated in the accompanying drawings, and more particularly pointed out in the appended claim, it being understood that changes may be made in the form, size, proportions, and minor details of construction, without departing from the spirit, or sacrificing any of the advantages of the invention.

In the drawings:

Fig. 2 is a view similar to Fig. 1 illustrating the collapsing of the frame.

Fig. 4 is a fragmentary, sectional, side-elevational view of the sled and frame.

Fig. 5 is a perspective view of the bottomless box.

Figures 1, 3:
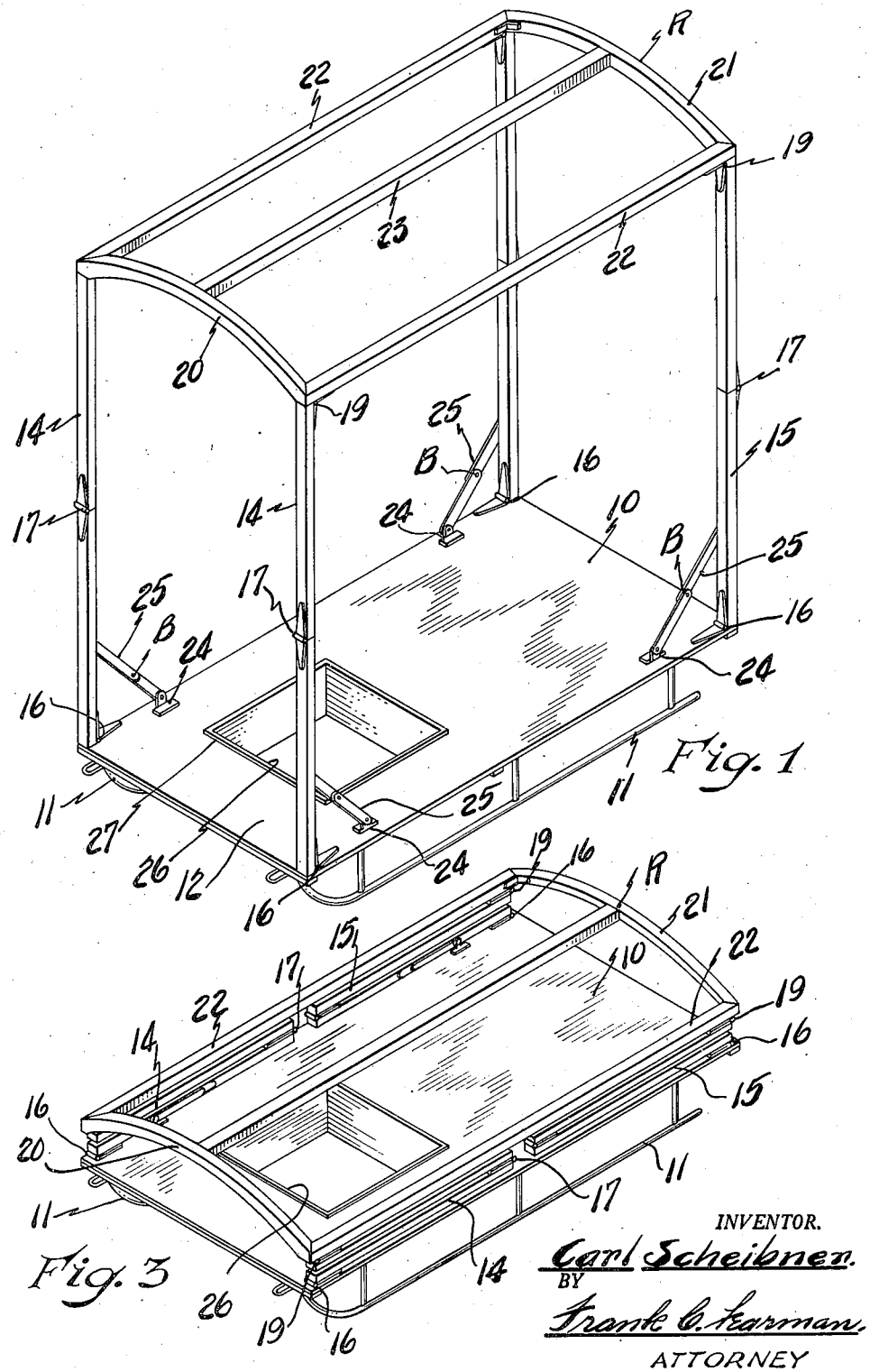
Fig. 1 is a perspective view showing the sled and collapsible frame in its raised position.
Fig. 3 is a perspective view showing the frame in collapsed position.

Referring now more specifically to the drawings in which I have shown one embodiment of my invention, the numeral 10 indicates a sled of conventional design; this is provided with runners 11, with a platform or floor 12 thereon as usual, and an opening 13 is provided in the floor and for a purpose to be presently described.

Front and rear corner supports 14 and 15 respectively, are hingedly connected to the floor 12 by means of hinges 16, these supports being formed in sections hingedly connected at 17, and the upper ends of the supports are hingedly connected to a roof frame R by means of hinges 19, the frame comprising front and rear bowed sections 20 and 21 respectively, connected by means of a horizontally disposed side member 22 and a center strip 23, all of which go to make up a rigid roof frame.

Clips 24 are secured to the floor 10 as shown, and leg braces 25 are pivotally connected to the clips 24 and to the supports 14 and 15, these braces being jointed intermediate their length as shown at B so that they can be readily folded when it is desired to collapse the frame, and as clearly shown in Fig. 2 of the drawings.

The frame is adapted to be covered by canvas (not shown) which canvas is readily collapsible with the frame, and I wish to direct particular attention to the fact that the supports 14 and 15 fold inwardly so that the members, when folded, are positioned within the marginal limits of the sled floor.

A bottomless box 26 fits into the opening 13 in the floor of the sled, and a shoulder 27 is provided around the upper edge thereof for engagement with the marginal edges of the opening 13 to form a stop and weather-proof connection, the structure being spotted on the ice so that the opening 13 is in direct vertical alignment with the hole in the ice (not shown); consequently, light will be excluded, and the fish will be clearly visible as they swim into the hole, thus making ideal spearing and/or hook and line fishing.

The frame and sled can be readily constructed and assembled; it provides a wind and weather-proof structure which can be heated by a small stove, if desired, and the raising and lowering can be easily and quickly accomplished by a single occupant.

The device is compact and light in weight; it can be readily carried in the trunk or rear compartment of an automobile, and is readily transportable from place to place.

From the foregoing description, it will be obvious that I have perfected a very simple, practical, and inexpensive collapsible frame and sled for fishing through the ice.

What I claim is:

A collapsible unit of the character described, comprising a sled having a floor, a collapsible superstructure mounted thereon and foldable entirely within the marginal limits of the sled floor, said superstructure comprising a plurality of vertical corner uprights, each upright comprising a plurality of hingedly connected sections with the lower sections hingedly connected to the floor, foldable braces hingedly connected to the sled floor and to the lower section of each corner upright, a rigid roof frame hingedly connected to the upper ends of the upper sections, said superstructure being adapted to be entirely covered and enclosed by a canvas covering, an opening in the sled floor, a bottomless, vertically adjustable box mounted therein and forming a closed passage from the sled floor to the ice, when the box is in its lowered position, a continuous, outwardly-projecting shoulder provided on the upper edge of the box, said shoulder engaging the floor when the box is in lowered position and forming a light-proof and weather-proof joint between the box and said floor.

CARL SCHEIBNER.

REFERENCES CITED

The following references are of record in the file of this patent:

UNITED STATES PATENTS

| Number | Name | Date |
|---|---|---|
| 1,270,782 | Carr et al. | July 2, 1918 |
| 1,386,943 | Moore | Aug. 9, 1921 |
| 2,301,089 | Stevens | Nov. 3, 1942 |

FOREIGN PATENTS

| Number | Country | Date |
|---|---|---|
| 20,740 | Australia | Dec. 29, 1934 |
| 23,893 | Great Britain | Apr. 20, 1911 |